United States Patent [19]

Sfredda

[11] 4,112,788
[45] Sep. 12, 1978

[54] TORQUE TRANSMISSION DEVICE

[76] Inventor: Albert Patrick Sfredda, 2106 Iris Pl., Bethlehem, Pa. 18018

[21] Appl. No.: 716,990

[22] Filed: Aug. 24, 1976

[51] Int. Cl.² ............................ F16H 3/44; F16H 1/28
[52] U.S. Cl. ..................................... 74/804; 74/750 R
[58] Field of Search ................ 74/804, 805, 801, 798, 74/750 R, 432

[56] References Cited

U.S. PATENT DOCUMENTS

| | | | |
|---|---|---|---|
| 3,013,447 | 12/1961 | Hils et al. | 74/805 |
| 3,330,171 | 7/1967 | Nasvytis | 74/798 X |
| 3,381,549 | 5/1968 | Hirakawa | 74/804 |
| 3,530,742 | 9/1970 | Sfredda | 74/805 X |
| 3,738,194 | 6/1973 | Lorence | 74/804 X |

*Primary Examiner*—Samuel Scott
*Assistant Examiner*—Lance W. Chandler

[57] ABSTRACT

A torque transmission device whereby eccentric drive rollers engage a raceway disposed within a driven wheel. The wheel's rim has a rolling surface with teeth disposed adjacent to this surface. The wheel's rolling surface engages a fixed surrounding raceway and the wheel's teeth engage a fixed ring of teeth that are adjacent to the raceway. The drive rollers engage the wheel's raceway in a manner that transmits torque to the wheel with leverage thereby substantially reducing the force transmitted to the teeth.

8 Claims, 3 Drawing Figures

TORQUE TRANSMISSION DEVICE

SUMMARY OF THE INVENTION

This present invention relates to torque transmission devices. It relates particularly to high reduction speed reducers. High reduction ratios are provided with planocentric gearing or planocentric type friction devices. (An example of this type of drive is illustrated in my patent, U.S. Pat. No. 3,530,742.) The friction drives are more efficient and produce higher ratios per stage than gear devices, but lack the positive nonslip advantage of the gear-type reducers.

It is an object of the present invention to provide a speed reducer that approaches the efficiency and high reduction ratios of the friction drives yet maintains the positive nonslip advantage of the gear-type speed reducers.

This is accomplished by a new principle wherein the drive member applies a lever effect upon a driven rolling gear.

These objects, principles, and advantages of the present invention will become more readily apparent from the following description when taken together with the accompanying drawings, wherein:

DISCLOSURE OF THE EMBODIMENT

Figure 1:
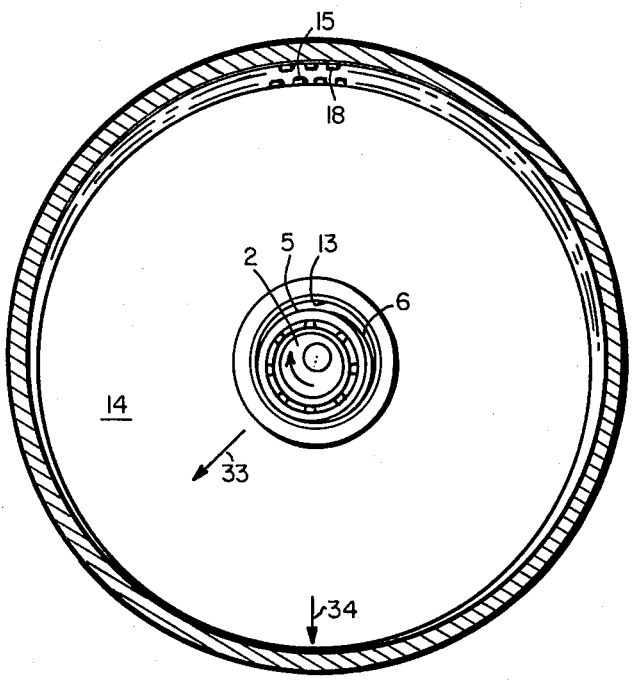
FIG. 1 is a sectional view of a speed reducer taken along planes indicated by view line 1—1, FIG. 2.
Figure 2:
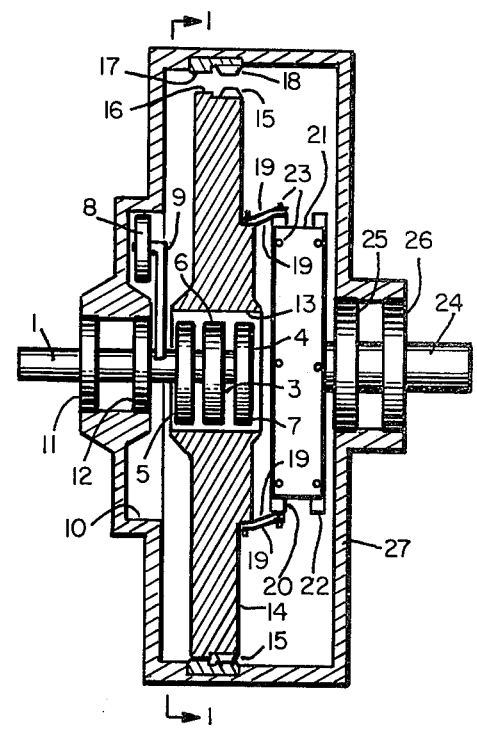
FIG. 2 is a sectional axial view of the speed reducer.

Referring to FIGS. 1 and 2, the numeral 1 indicates a drive shaft. Rigidly secured to the drive shaft are eccentrically mounted hubs 2, 3, 4, that support roller bearings 5, 6, 7. Bearing 6 is radially disposed 90° relative to bearings 5, 7. Roller 8 is secured to shaft 1 by support 9 which may be flexible or rigid. Roller 8 engages housing raceway 10 and is radially disposed 180° relative to group of bearings 5, 6, 7. Ball bearings 11, 12, support shaft 1. Bearings 5, 6, 7, engage raceway 13 disposed in wheel 14. Teeth 15 are disposed around rim of wheel 14. Adjacent to teeth 15 is a smooth rolling surface 16. Housing raceway 17 engages wheel's rolling surface 16, and adjacent housing teeth 18 engage wheel teeth 15. Flexible leaves 19 connect wheel 14 to square plate 20, vertical leaves 21 (two on each side) connect plate 20 to shaft plate 22. Flexible leaves 19, 21 are secured by screws 23. Shaft plate 22 is secured to output shaft 24. Shaft ball bearings 11, 12, 25, 26, are supported by housing 27.

In operation, clockwise rotation of shaft 1 produces planetary rotation of roller bearings 5, 6, 7. This rotation forces bearings 5, 7 against raceway 13, causing wheel 14 to rotate counter clockwise by creating a radial force on the wheel in direction shown by arrow 33. This angle of attack causes the wheel to act as a lever with its pivot point being on raceway 17 shown by arrow 34. This torque-producing, rolling action substantially reduces the force transmitted to the teeth, thereby permitting the use of smaller teeth. Smaller teeth permit the wheel's diameter to approach more closely the diameter of the surrounding teeth 15 and raceway 17, thereby producing very high reduction ratios. Smaller teeth also reduce the frictional losses, resulting in greater efficiency and durability. Bearing 6 stabilizes wheel 14, but does not transmit a force to wheel. To eliminate vibrations, roller 8 transmits centrifugal force to raceway 10. This balances the centrifugal force of wheel 14. Flexible leaves 19, 21 permit eccentric rotation of wheel 14 relative to shaft 24.

In the embodiment discribed above, about 50% of the torque is transmitted by pure rolling action and 50% is dependant upon the teeth; however, this proportion can vary slightly by changing the angle of attack of the drive roller relative to the driven wheel.

Figure 3:
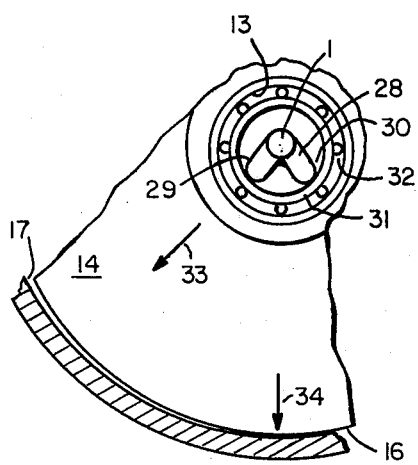
FIG. 3 is a sectional fragment of a modified form of the input drive mechanism.

FIG. 3 shows a modified form of the input drive mechanism. V-shaped member 28 is secured to input shaft 1. V-member's rounded tips 29, 30, contact inner ring 31. Small rollers 32 are disposed between inner ring and wheel raceway 13. (Ball or needle bearings can be substituted for this bearing arrangement.) Rotation of spoke tip 29 has the same torque producing function as roller bearings 5, 7, as shown in FIG. 1. Spoke tip 30 has the same wheel stabilizing function as roller bearing 6. Inner ring 31 rotates with V-member 28, rollers 32 prevent skidding between tips 29, 30 and inner ring 31.

I claim:

1. A torque transmission device comprising; a wheel having an inner concentric raceway, the rim of said wheel having a rolling surface and teeth formed about said rim, a fixed annular raceway having teeth formed about the path of said annular raceway, said annular raceway encircling and engaging said wheel, the diameter of said raceway being larger than the diameter of said wheel so as to permit wheel rotation thereon; said wheel teeth having a rolling drive interengagement with said raceway teeth thereby permitting positive wheel rotation on said annular raceway, a rotatably supported drive shaft positioned concentrically relative to said fixed annular raceway, a drive member secured to said drive shaft, said drive member engaging a portion of the inner raceway of said wheel, whereby rotation of said drive shaft will cause said drive member to impart a radial drive force to said wheel, a rotatably supported output shaft positioned concentrically to said drive shaft and coupling means connecting said output shaft to said wheel, whereby torque produced by the orbital rotation of said wheel is transmitted to said output shaft.

2. A device as in claim 1 wherein said drive member comprises at least two rollers eccentrically mounted on said drive shaft, said rollers engaging the inner concentric raceway of said wheel for rotation thereon.

3. A device as in claim 1 wherein said drive member comprises; two spokes rigidly secured to said drive shaft, said spokes being arranged generally in a V formation, a ring concentrically disposed within said raceway, said spokes engaging the inner surface of said ring and a plurality of rolling elements disposed between and in contact with said ring and said inner raceway of said wheel.

4. A device as in claim 1 wherein coupling means for connecting said wheel to said drive shaft comprises; a floating support member, a first set of flexible leaves disposed parallel one on each side of said support member and connecting said support member to said wheel, a second set of flexible leaves positioned generally at right angles relative to said first set, said second set of flexible leaves disposed parallel one on each side of said support member and connecting said support member to said drive shaft.

5. A device as in claim 1 wherein the teeth of said wheel are formed along at least one of the sides of the rolling surface of said wheel, the pitch diameter of said wheel teeth being equal to the diameter of the rolling surface of said wheel and wherein said teeth of said annular raceway are formed along at least one of the sides of said annular raceway, the pitch diameter of said annular raceway teeth being equal to the inside diameter of said annular raceway.

6. A device as in claim 1 including means for dynamically balancing said device, said means comprising; a roller connected to said drive shaft for rotation therewith, said roller being diametrically opposed to said wheel, a fixed raceway concentric to the rotational axis of said drive shaft, said roller engaging said fixed raceway for rotation thereon.

7. A torque transmission device comprising; a housing having an internal annular raceway, said raceway including a plurality of internally projecting teeth disposed along its path, a wheel of smaller diameter than said annular raceway diameter disposed within said annular raceway, said wheel axis being eccentric and parallel relative to said annular raceway axis, said wheel including a rolling surface and teeth disposed along its outer periphery, said wheel rolling surface rotatably engaging said annular raceway and said wheel teeth rotatably meshing with said annular raceway teeth thereby permitting positive wheel rotation on said annular raceway, said wheel also having an inner concentric raceway, a ring disposed concentrically within said inner raceway, a plurality of rolling elements disposed between and in contact with said ring and said inner raceway, a drive member rotatably mounted with its axis concentric with the axis of said annular raceway, said drive member having at least one radially projecting member for rotation therewith, said radially projecting member engaging the inner surface of said ring whereby rotation of said drive member will cause said radially projecting member to impart a radial driving force to said wheel, coupling means for connecting said wheel to an output member, whereby wheel torque is transmitted to said output member.

8. A device as in claim 7 wherein said drive member comprises; a drive shaft and said radially projecting member is rigidly secured to said drive shaft.

* * * * *